United States Patent [19]
Hurite

[11] Patent Number: 5,398,995
[45] Date of Patent: Mar. 21, 1995

[54] REAR SEAT HANDLELESS LATCH

[75] Inventor: John M. Hurite, Southfield, Mich.

[73] Assignee: Tachi-S Engineering U.S.A., Inc., Farmington Hills, Mich.

[21] Appl. No.: 967,743

[22] Filed: Oct. 28, 1992

[51] Int. Cl.$^6$ .............................................. B60N 2/02
[52] U.S. Cl. ........................ 297/378.12; 297/378.14; 297/378.1
[58] Field of Search ............ 297/378.1, 378.12–378.14

[56] References Cited

U.S. PATENT DOCUMENTS

| | | | |
|---|---|---|---|
| 2,513,860 | 7/1950 | Gordon | 297/364 X |
| 3,007,737 | 11/1961 | Lichter | 297/378.1 |
| 4,008,920 | 2/1977 | Arndt | 297/364 X |
| 4,070,058 | 1/1978 | Muehling | 297/378.12 X |
| 4,103,970 | 8/1978 | Homier | 297/378.1 X |
| 4,206,946 | 6/1980 | Maertens | 297/379 |
| 4,219,234 | 8/1980 | Bell | 297/378.1 X |
| 4,260,190 | 4/1981 | Holloway et al. | 297/378.13 X |
| 4,365,837 | 12/1982 | Mizzelle | 297/378.12 X |
| 4,435,013 | 3/1984 | Arihara | 297/364 |
| 4,475,763 | 10/1984 | Hamatani | 296/65 R |
| 4,770,463 | 9/1988 | Nishino | 297/367 |
| 4,771,507 | 9/1988 | Draplin et al. | 16/297 |
| 4,775,186 | 10/1988 | Nishino | 297/367 |
| 4,856,847 | 8/1989 | Kanai | 297/341 |
| 4,863,219 | 9/1989 | Ochiai | 297/443 |
| 4,869,541 | 9/1989 | Wainwright | 296/65.1 |
| 4,909,570 | 3/1990 | Matsuhashi | 297/341 |
| 4,909,572 | 3/1990 | Kanai | 297/452 |
| 4,925,229 | 5/1990 | Siebler | 296/65.1 |
| 4,932,706 | 6/1990 | Wainwright et al. | 296/65.1 |
| 4,969,682 | 11/1990 | Gray | 297/378.12 |
| 4,997,223 | 3/1991 | Croft | 297/378.12 X |
| 5,015,026 | 5/1991 | Mouri | 296/65.1 |

Primary Examiner—Peter M. Cuomo
Assistant Examiner—Suzanne L. Dino
Attorney, Agent, or Firm—Basile and Hanlon

[57] ABSTRACT

A handleless locking hinge mechanism is connected between the seat back and the support structure. The handleless locking hinge mechanism includes a cup-shaped mounting bracket having a central axis. The bracket connectible to the seat back centered on a hinge axis. Two opposing elongated detent springs connected to an interior surface of the bracket at a first end and extending inwardly and arcuately toward the hinge axis with a detent formed adjacent a second end. The detent concave with respect to the hinge axis. An elongated support having a central axis disposed coaxial with the hinge axis. The support connectible to the support structure at a first end and having a second end extending inwardly within the bracket. Two opposing generally cylindrical elongated rollers having longitudinal axes disposed on opposite radial sides of the elongated support in a common plane with the hinge axis. Each roller is supported at both ends from the elongated support within the bracket for engagement with one of the springs. Each roller is engaged within the detent of the respective spring when in the collapsed position, such that a predetermined force applied to the seat back causes dislodging movement of the roller from the respective detent against the spring bias allowing the seat back to be raised to the upright position.

6 Claims, 2 Drawing Sheets

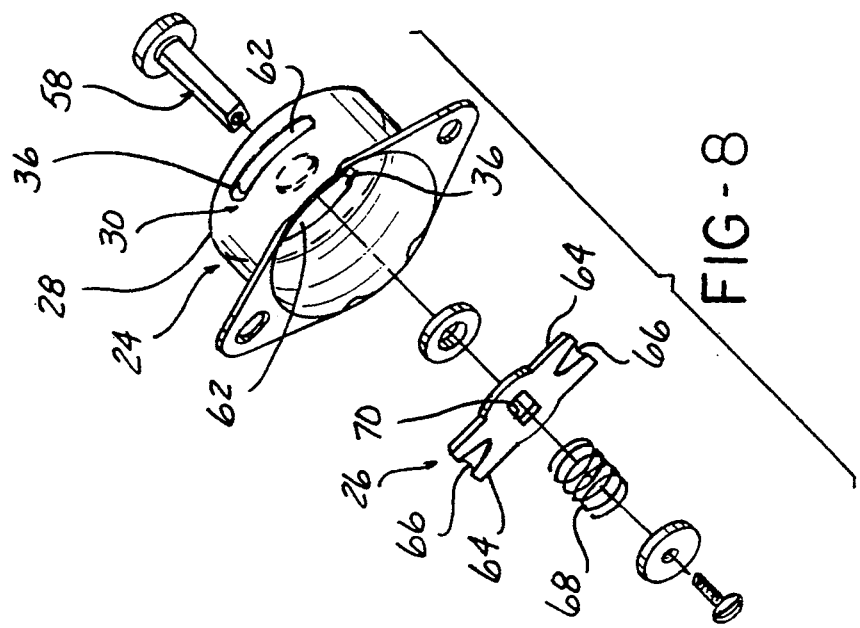
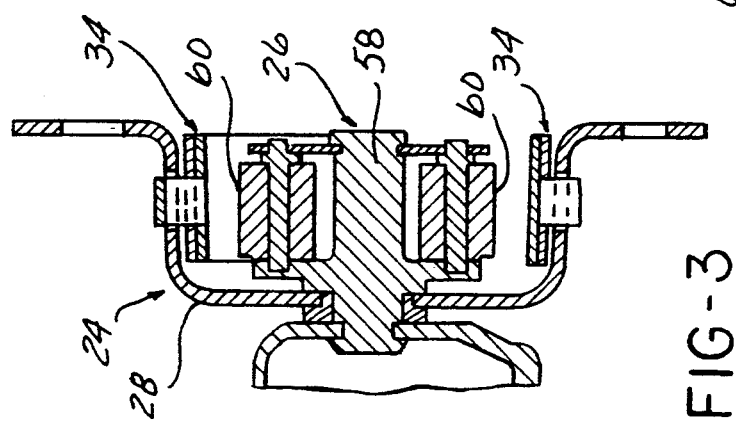
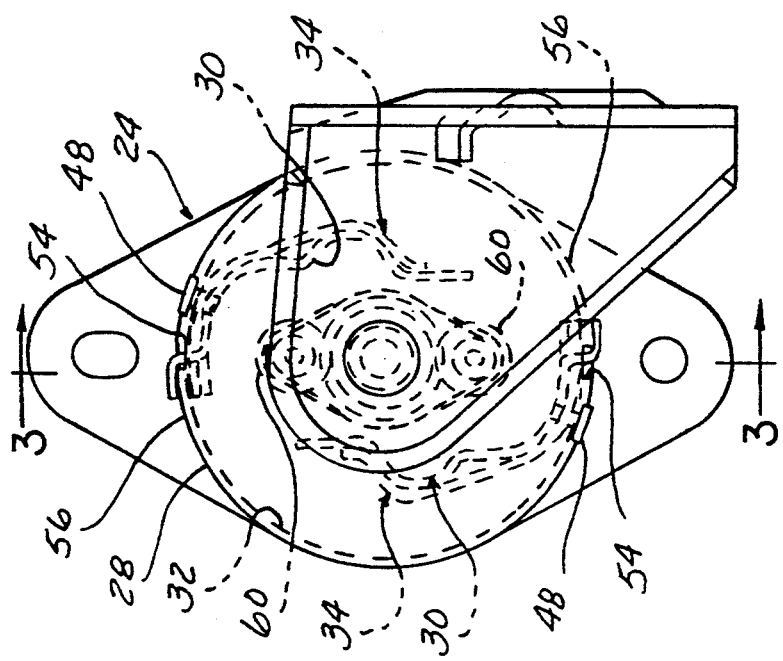
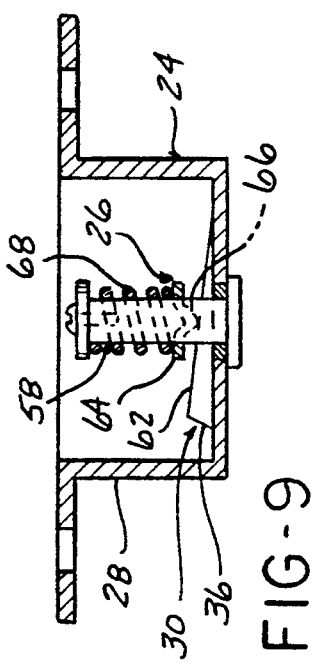

5,398,995

REAR SEAT HANDLELESS LATCH

FIELD OF THE INVENTION

This invention relates to a vehicle convertible seat and locking arrangement, and more particularly, to a handleless locking device that locks the seat back in a horizontal position.

BACKGROUND OF THE INVENTION

In a vehicle having a convertible seat whose back is to be locked in both an upright position for passenger use and a horizontal position for storage use, a car body connector hinge is generally provided for anchoring the seat back cushion to the body of the automobile and has a pivot point or hinge axis allowing the seat back cushion to pivot between the horizontal position and the upright position.

A rear seat arrangement has conventionally been used in which the lower portion at a front edge of a seat cushion is pivotally supported on a seat floor surface of a vehicle body, while the lower portion of a seat back is coupled to the seat floor surface through a double-hinge connection, so that when the motor vehicle is to be loaded with a large load, the seat cushion is rotated forward for erection about the lower portion at its front edge, and by folding down the seat back into a space formed in the seat floor surface by the displacement of the seat cushion, the back face of the seat back is held generally flush with a load carrying platform located behind the rear seat arrangement for expansion of the load carrying accommodation area for the platform.

Another known configuration includes a seat which is capable of folding between an upright seating position and a forwardly folded position. In the forwardly folded position, the back of the seat is often used as a load carrying surface. That is, as the seat is folded, the back can be used as an extension of the vehicle floor to carry loads other than people. The seat assembly includes a frame having a plurality of links pivotally secured together which form a parallelogram. The assembly further includes a collapsible cross-link that allows the frame assembly to be moved to the forwardly folded position and locks the same in the upright seating position. The seating load on the frame is carried in tension by the cross-link. When a force is applied in the forward direction of the vehicle, however, the cross-link is placed in compression and carries the load in compression. This compressive force requires a relatively heavy and sturdy beam.

While these known configurations may perform the intended function adequately, the configurations require relatively complex hinge and lock mechanisms. The complexity of the mechanisms increase the weight generally beyond that considered acceptable by modern automotive manufacturers. In addition, these mechanisms can be more difficult to operate and typically have numerous moving parts which generally increases the probability of problems associated with the mechanism due to wear of the moving parts.

SUMMARY OF THE INVENTION

Therefore, in the present invention it would be desirable to provide a mechanism that reduced the number of moving parts. It would further be desirable to simplify the operation of the mechanism to facilitate easy use of the mechanism by the vehicle operator. In addition, it would be desirable to reduce the amount of weight associated with the mechanism to increase fuel economy without sacrificing structural integrity. It would also be desirable in the present invention to reduce the amount of space required for the mechanism. It would further be desirable to provide a mechanism that eliminated the need for operating a handle to release the seat back from the horizontal position.

These and other desirable characteristics and features are provided according to the present invention with an improved handleless locking hinge mechanism. The handleless locking hinge mechanism may be connected between the seat back and vehicle support structure. The mechanism preferably includes first means connected to one of the vehicle support structure and seat back for releasably holding the seat back in at least one predefined position, and second means in contact with the first means and connected to the other of the vehicle support structure and seat back, such that one of the first means and second means moves relative to the other in response to movement of the seat back, where the second means operatively engages the first means to oppose pivotal movement of the seat back from the stacked position toward the upright position.

In a preferred configuration, the first means may include a mounting bracket with detent means connected to the mounting bracket for stopping and for releasably holding the seat back in the horizontal or stacked position, such that a predetermined force applied to the seat back in a direction toward the upright position releases the seat back from the stacked position. The detent means in one configuration may include at least one elongated spring member connected to the mounting bracket at one end and having a detent formed therein adjacent an opposite end, where the detent is operably engaged by the second means when in the stacked position. The detent may be formed concave with respect to the hinge axis in the preferred configuration.

In an alternative configuration, the detent means may include at least one elongated ramp-like protuberance extending outwardly from the mounting bracket and having a detent defined in the mounting bracket adjacent a high end of the ramp-like protuberance, where the detent is operably engaged by the second means when in the stacked position.

In the preferred configuration, the second means may include an elongated support having a central axis disposed coaxial with the hinge axis, where the support is connectible to one of the support structure and the seat back at a first end and has a second end extending inwardly within the mounting bracket. In the preferred configuration, two opposing elongated rollers having longitudinal axes are disposed on opposite radial sides of the elongated support in a common plane with the hinge axis. Each roller is supported at both ends from the elongated support within the mounting bracket for engagement with a respective one of the springs. Each roller is engaged within the detent of the respective one of the springs when in the collapsed or stored position such that a predetermined force applied to the seat back in a direction toward the upright position causes dislodging movement of each roller from the respective detent against the spring biased force allowing the seat back to be raised to the upright position.

In an alternative configuration, the second means may include an elongated support having a central axis disposed coaxial with the hinge axis, where the support is connectible to one of the support structure and seat back at a first end and has a second end extending inwardly within the mounting bracket. A radially extending member is carried by the support in a manner allowing axial displacement along the support. Axially extending projections are formed on the radially extending member for engagement with the ramp-like protuberance. The radially extending member is biased axially by spring means into engagement with the ramp-like protuberance. When the seat back is in the stacked or horizontal position, the axially extending projection of the radially extending member is engaged with the mounting bracket and movement of the seat back toward the upright position is prevented by engagement between the high end of the ramp-like protuberance and the axially extending projection. Application of a predetermined force to the seat back in a direction toward the upright position causes dislodging movement of the axially extending projection over the high end of the ramp-like protuberance formed in the mounting bracket allowing the seat back to be raised to the upright position as the axially extending projection moves down the ramp-like protuberance from the high end to the low end.

An upper lock mechanism is provided connected to an upper portion of the seat back for releasably securing the seat back in an upright position in cooperation with the support structure of the vehicle. The upper lock mechanism is operated independently of the handleless locking hinge mechanism. This allows the upper lock mechanism to provide the desired strength and stability of the seat when in a riding position for passenger use.

The preferred embodiment of the present invention provides a handleless locking hinge for connecting a seat back relative to a support structure of a vehicle for movement about a hinge axis between an upright position and a collapsed position. The handleless locking hinge preferably includes a cup-shaped mounting bracket having a central axis, where the cup-shaped mounting bracket is connectible to the seat back centered on the hinge axis. The cup-shaped mounting bracket has an interior surface extending generally in an axial direction. Two opposing elongated detent springs are connected to the interior surface of the cup-shaped mounting bracket. Each spring is connected to the interior surface at a first end and extends inwardly and arcuately toward the hinge axis with a detent formed adjacent a second end. The detent is formed concave with respect to the hinge axis. An elongated support having a central axis is disposed coaxial with the hinge axis. The support is connectible to the support structure of the vehicle at a first end and has a second end extending inwardly within the cup-shaped mounting bracket. Two opposing generally cylindrical elongated rollers having longitudinal axes are disposed on opposite radial sides of the elongated support in a common plane with the hinge axis. Each roller is supported at both ends from the elongated support within the cup-shaped mounting brackets for engagement with a respective one of the springs. Each roller is engaged within the detent of the respective one of the springs when in the collapsed position such that a predetermined force applied to the seat back in a direction toward the upright position caused dislodging movement of each roller from the respective detent against the spring bias allowing the seat back to be raised to the upright position.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout these several views, and wherein:

FIG. 2 is a side elevational view showing the handleless locking hinge mechanism according to the present invention;

FIG. 3 is a cross-sectional view of the handleless locking hinge mechanism taken as shown in FIG. 2;

FIG. 8 is an exploded perspective view of an alternative embodiment of the handleless locking hinge mechanism according to the present invention; and FIG. 9 is a partial cross-sectional view of the handleless locking hinge mechanism according to the embodiment illustrated in FIG. 8.

BRIEF DESCRIPTION OF THE PREFERRED AND ALTERNATIVE EMBODIMENTS

Figure 1:
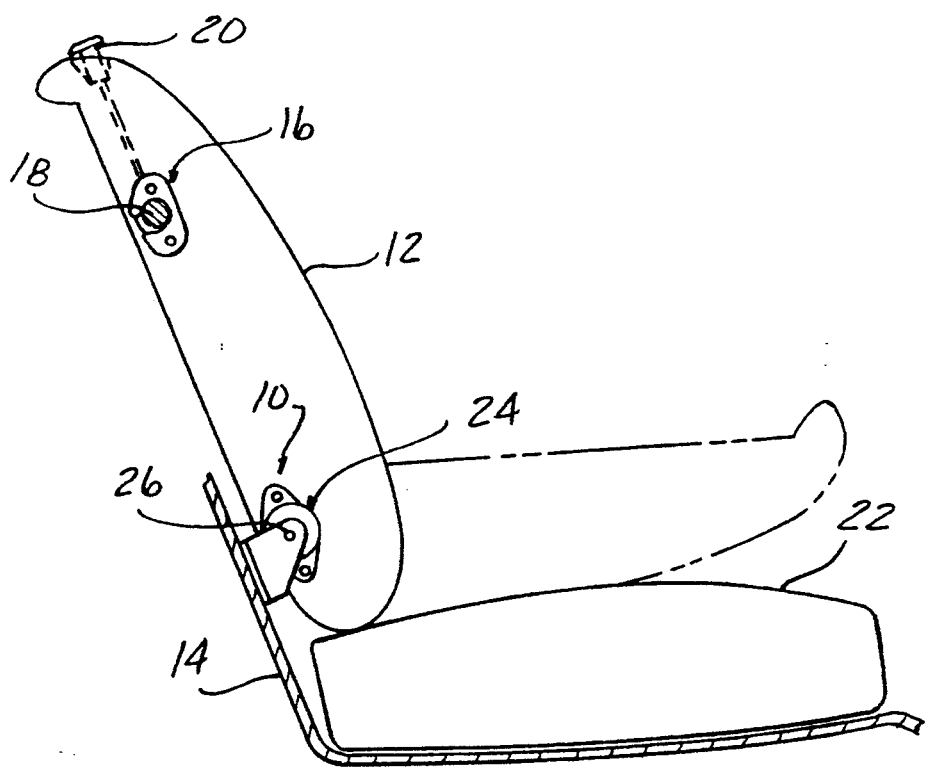
FIG. 1 is a side elevational view of a vehicle seat moveable between an upright position and a horizontal or collapsed position.

A vehicle convertible rear seat is shown in FIG. 1 having a handleless rear seat locking hinge means 10 connecting the moveable seat back 12 to the vehicle support structure 14. The seat back 12 is moveable between an upright or riding position for passenger use and a generally horizontal, stacked or collapsed position, shown in phantom, for storage use. A releasable upper lock means 16 is provided for operable engagement with an upper portion of the vehicle support structure. The releasable upper lock means 16 is operable independently of the handleless rear seat locking hinge means 10. This allows the releasable upper lock means 16 to provide the desired strength and stability of the rear seat when in a riding or upright position for passenger use. When the release mechanism 20 is actuated, the seat back 12 can be moved from the position shown in FIG. 1 to a generally horizontal position, shown in phantom, for storage. This storage position shown in phantom may be a stacked position where the seat back 12 lays on a top surface of a seat cushion 22.

The handleless rear seat locking hinge means 10 is shown in more detail in FIGS. 2 and 3. The handleless locking hinge means 10 includes first means 24 connected to one of the vehicle support structure 14 and seat back 12 for releasably holding the seat back 12 in at least one predefined position, and second means 26 in contact with the first means 24 and connected to the other of the vehicle support structure 14 and seat back 12, such that one of the first means 24 and second means 26 moves relative to the other in response to movement of the seat back 12, where the second means 26 operatively engages the first means 24 to oppose pivotal movement of the seat back 12 from the horizontal position toward the upright position. For purposes of illustration and description, the handleless locking hinge means 10 will be described with respect to the first means 24 being connected to the seat back 12 and the second means 26 being connected to the vehicle support structure 14. However, it should be apparent to those skilled in the art that the second means 26 could be connected to the seat back 12 while the first means 24 is connected to the vehicle support structure 14, so long as one of the first and second means, 24 and 26 respectively, is held stationary while the other moves in response to movement of the seat back 12 to operably engage the stationary one.

In the preferred configuration, the first means 24 can include a mounting bracket 28 with detent means 30 connected to the mounting bracket 28 for stopping and for releasably holding the seat back 12 in the horizontal or stacked position. A predetermined force applied to the seat back 12 in a direction toward the upright position releases the seat back 12 from the horizontal or stacked position. The mounting bracket 28 may be formed with a cup-like shape having a longitudinal axis and an axially extending inner sidewall surface 32. The detent means 30 in its preferred configuration may include at least one elongated spring means 34 connected to the inner sidewall surface 32 of the mounting bracket 28 at one end and having a detent 36 formed in the spring means 34 spaced outward from the one end or adjacent an opposite end. The detent 36 is operably engaged by the second means 26 when in the generally horizontal or stacked position. The detent 36 may be formed concave with respect to the hinge axis in the preferred configuration. Preferably, two spring means 34 are connected to the inner side surface 32 of the mounting bracket 28 at respective ends opposite from one another and extend angularly and arcuately outwardly from the inner sidewall surface 32. Each spring means 34 having a detent 36 formed thereon spaced outwardly from the end connected to the inner sidewall surface 32. Each detent formed concave with respect to a hinge axis about which the seat back 12 moves between the upright and generally horizontal positions. The concave detents formed facing one another for operable engagement with the second means when the seat back 12 is in the generally horizontal or stacked position.

Figure 4:
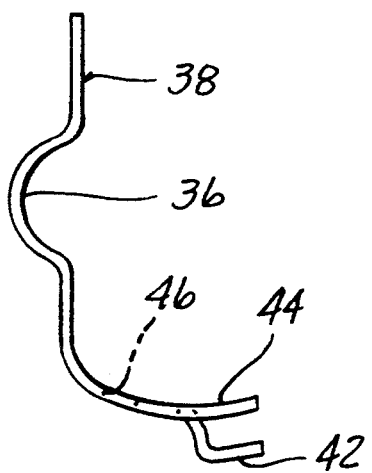
FIG. 4 is a side elevational detailed view of a first spring member used in the preferred embodiment of the present invention.
Figure 6:
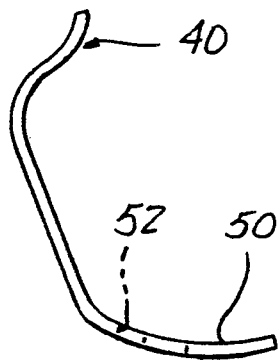
FIG. 6 is a side elevational detailed view of a second spring member used in the preferred embodiment of the present invention.
Figure 5:
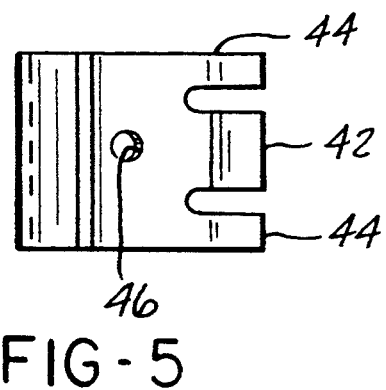
FIG. 5 is a top view of the first spring member shown in FIG. 4.
Figure 7:
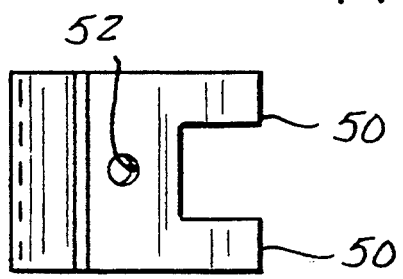
FIG. 7 is a top view of the second spring member shown in FIG. 6.

As can best be seen in FIGS. 4–7, the elongated spring means 34, in the preferred configuration, may include more than one leaf-like spring member. A first leaf-like spring member 38 is shown in FIGS. 4 and 5 and a second leaf-life spring member 40 is shown in FIGS. 6 and 7. The second spring member 40 is interposed between the first spring member 38 and the inner sidewall surface 32 of the mounting bracket 28. The second member 40 adds additional rigidity and strength to the spring means 34. The first spring member 38 shown in FIGS. 4 and 5 is of generally arcuate shape and has an outwardly extending bent tab 42 adjacent a first end. The bent tab 42 is disposed between two end tabs 44. Spaced inwardly from the longitudinal end of the first spring member 38 is an aperture 46 for receiving attachment means 48, such as a rivet, bolt, screw, heat stake, weld or the like, for securing the first and second spring members 38 and 40 respectively to the mounting bracket 28. Longitudinally spaced from the first end of the first spring member 38 and from the aperture 46, toward the second end is detent 36 for operably receiving the second means 26 when the seat back 12 is in the generally horizontal or stacked position.

Referring now to FIGS. 6 and 7, the second spring member 40 includes a slot defined by longitudinally extending tabs 50 at a first end. Spaced longitudinally inwardly from the first end of the second spring member 40 is an aperture 52, which when brought into alignment with aperture 46 allows passage of attachment means 48 through both spring members for holding the spring members in registry with the inner sidewall surface 32 of the mounting bracket 28. The slot defined by longitudinally extending tabs 50 allows passage of the outwardly extending bent tab 42 from its radially inner position with respect to the hinge axis outwardly through the second spring member 40 and through an aperture 54 formed in the sidewall of the mounting bracket 28, as best seen in FIG. 2. The outwardly extending bent tab 42 extends between the longitudinally extending tabs 50 and out of aperture 54 formed in the sidewall surface of the mounting bracket 28 to a position where the bent tab 42 is bent to overlay the outer sidewall surface 56 of the mounting bracket 28. The other end of the second spring member 40 extends arcuately outwardly from the first end and engages over the backside or rear surface of the detent 36 to reenforce the first spring member 38.

In the preferred configuration, the second means 26 may include an elongated support 58 having a central axis disposed coaxial with the hinge axis, where the support 58 is connectible to one of the vehicle support structure 14 and the seat back 12 at a first end and has a second end extending inwardly within the mounting bracket 28. For purposes of illustration and description, the second means 26 will be shown and described with respect to the elongated support 58 being connected to the vehicle support structure 14. The elongated support 58 is held in a fixed, non-moveable position with respect to the vehicle support structure 14. The mounting bracket 28 moves with respect to the elongated support 58 in response to movement of the seat back 12. At least one elongated roller 60, having a longitudinal axis in a common plane with the hinge axis and spaced from the hinge axis, is supported from the elongated support 58 within the mounting bracket 28 for engagement with the at least one elongated spring means 34. Preferably, two opposing elongated, generally cylindrical, rollers 60, having longitudinal axes disposed on opposite radial sides of the elongated support 58 in a common plane with the hinge axis and spaced from the hinge axis, are supported at both longitudinal ends from the elongated support 58 for engagement with the first means 24. Each roller 60 preferably is of generally cylindrical shape, but may be tapered or otherwise shaped as desired. Each roller 60 is engaged within the detent 36 of the respective one of the first spring members 38 when the seat back 12 is in the generally horizontal storage, collapsed or stacked position. A predetermined force applied to the seat back 12 in a direction toward the upright position is sufficient to cause dislodging movement of each roller 60 from the respective detent 36 against the spring bias force, allowing the seat back 12 to be moved to the upright position and secured in place by the releasable upper lock means 16.

It should be understood from the foregoing description that the longitudinal axis of the elongated support 58 defines the hinge axis about which the seat back 12 moves between the upright position and the generally horizontal position. The cup-shaped mounting bracket 28 is pivotally connected to the elongated support 58 for movement about this hinge axis. Since the mounting bracket 28 is connected to the seat back 12, movement of the seat back 12 causes rotation of the cup-shaped mounting bracket 28 about the elongated support 58 bringing the elongated spring means 34 into operable engagement with the stationary rollers 60. Of course, it should be apparent that the described configuration could be reversed, such that the cup-shaped mounting bracket 28 could remain stationary while the elongated support was pivotable with respect to the mounting bracket in response to movement of the seat back 12. The elongated support 58 would in this instance be connected to the seat back 12 so that the rollers supported by the elongated support 58 would move against the fixed, non-moveable spring means 34 in response to movement of the seat back 12.

In an alternative configuration shown in FIGS. 8 and 9, the handleless locking hinge means 10 includes first means 24 connected to one of the vehicle support structure 14 and seat back 12 for releasably holding the seat back 12 in at least one predefined position, and second means 26 in contact with the first means 24 and connected to the other of the vehicle support structure 14 and seat back 12, such that one of the first means 24 and second means 26 moves relative to the other in response to movement of the seat back 12 and where the second means 26 operatively engages the first means 24 to oppose pivotal movement of the seat back 12 from the horizontal position toward the upright position. The first means 24 can include a mounting bracket 28 with detent means 30 connected to the mounting bracket 28 for stopping and for releasably holding the seat back 12 in the horizontal or stacked position. A predetermined force applied to the seat back 12 in a direction toward the upright position releases the seat back 12 from the horizontal or stacked position. In the configuration shown in FIG. 8, the detent means 30 includes at least one elongated ramp-like protuberance 62 extending outwardly from the mounting bracket 28. Each elongated ramp-like protuberance 62 having a detent 36 defined in the mounting bracket 28 adjacent a high end of the ramp-like protuberance 62. The detent 36 operably engageable with the second means when in the generally horizontal or stacked position. Preferably, two elongated ramp-like protuberances 62 are formed in an arcuate manner radially spaced on opposite sides of the hinge axis. The high end of the first ramp-like protuberance 62 being circumferentially adjacent the low end of the second ramp-like protuberance 62.

In the alternative configuration as shown in FIGS. 8 and 9, the second means 26 may include an elongated support 58 having a central axis disposed coaxial with the hinge axis, where the support 58 is connectible to one of the vehicle support structure 14 and the seat back 12 at a first end and has a second end extending inwardly within the mounting bracket 28. For purposes of illustration and description, the second means 26 will be shown and described with respect to the elongated support 28 being connected to the vehicle support structure 14. The elongated support 58 is held in a fixed, non-moveable position with respect to the vehicle support structure 14. The mounting bracket 28 moves with respect to the elongated support 58 in response to movement of the seat back 12. A radially extending member 64 is carried by the elongated support 58 in a manner allowing axial displacement of the radially extending member 64 along the longitudinal axis of the elongated support 58. At least one axially extending projection 66 is formed on the radially extending member 64 for engagement with the at least one elongated ramp-like protuberance 62. The radially extending member 64 is biased axially by spring means 68 into engagement with the ramp-like protuberance 62. When the seat back is in the stacked or horizontal position, the axially extending projection 66 of the radially extending member 64 is engaged with the mounting bracket 28 and movement of the seat back 12 toward the upright position is prevented by engagement between the high end of the ramp-like protuberance 62 and the axially extending projection 66. Application of a predetermined force to the seat back in a direction toward the upright position causes dislodging movement of the axially extending projection 66 over the high end of the ramp-like protuberance 62 formed in the mounting bracket 28, allowing the seat back 12 to be raised to the upright position as the axially extending projection 66 moves down the ramp-like protuberance 62 from the high end to the low end. As shown in FIG. 8, preferably the radially extending member 64 includes a shaped aperture 70 complementary in cross-section to the outer portion of the elongated support 58. The shaped aperture 70 may be in the form of a rectangular, or square cross-section to prevent rotational movement of the radially extending member 64 with respect to the elongated support 58, while allowing axial movement of the radially extending member 64 with respect to the elongated support 58. In its preferred form of this alternative embodiment, the radially extending member 64 extends in radially opposite directions to form a diametrically extending member 64 having two axially extending projections 66 engageable with two elongated ramp-like protuberances 62 formed in the mounting bracket 28.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a seat assembly for a vehicle including a seat cushion disposed in a generally horizontal riding position with respect to a support structure connected to said vehicle, a seat back moveable about a hinge axis between an upright position wherein said seat back extends upwardly with respect to said seat cushion, and a stacked position wherein said seat back lays on a top surface of said seat cushion, an upper lock means connected to an upper portion of said seat back for releasably securing said seat back in said upright position in cooperation with said support structure of said vehicle, the improvement of handleless locking hinge means connected between the seat back and support structure comprising:

first means for releasably holding said seat back in said stacked position, said first means connected to one of the support structure and seat back, said first means including detent means for stopping and for releasably holding said seat back in said stacked position, such that a predetermined force applied to said seat back in a direction toward said upright position releases said seat back from said stacked position, said first means including a mounting bracket having a longitudinal axis and an axially extending sidewall, and said detent means connected to said mounting bracket, wherein said detent means includes at least one spring member connected to said mounting bracket at one end and extending radially, arcuately inwardly toward said hinge axis, said spring member having a detent formed therein adjacent an opposite end; and second means in contact with said detent means and connected to the other of the support structure and seat back, such that one of the first means and second means moves relative to the other in response to movement of the seat back, said second means for operatively engaging said detent means to oppose pivotal movement of the seat back from the stacked position toward the upright position, said detent operably engaged said second means when in said stacked position.

2. The improvement of claim 1 wherein said detent is concave with respect to said hinge axis.

3. In a seat assembly for a vehicle including a seat cushion disposed in a generally horizontal riding position with respect to a support structure connected to said vehicle, a seat back moveable about a hinge axis between an upright position wherein said seat back extends upwardly with respect to said seat cushion, and a stacked position wherein said seat back lays on a top surface of said seat cushion, an upper lock means connected to an upper portion of said seat back for releasably securing said seat back in said upright position in cooperation with said support structure of said vehicle, the improvement of handleless locking hinge means connected between the seat back and support structure comprising:

first means for releasably holding said seat back in said stacked position, said first means connected to one of the support structure and seat back, said first means including detent means for stopping and for releasably holding said seat back in said stacked position, such that a predetermined force applied to said seat back in a direction toward said upright position releases said seat back from said stacked position; and second means in contact with said detent means and connected to the other of the support structure and seat back, such that one of the first means and second means moves relative to the other in response to movement of the seat back, said second means for operatively engaging said detent means to oppose pivotal movement of the seat back from the stacked position toward the upright position, wherein said second means includes an elongated support having a central axis disposed coaxial with said hinge axis, said support connectible to said vehicle support structure at a first end and having a second end extending toward said first means, and projection means supported from said elongated support for engaging said detent means when in said stacked position, wherein said projection means includes two opposing generally cylindrical elongated rollers having longitudinal axes disposed on opposite radial sides of said elongated support in a common plane with said hinge axis, each roller supported at both ends from said elongated support within said cup-shaped mounting bracket for engagement with respective springs, each roller engaged within said detent means of said respective springs when in said stacked position such that a predetermined force applied to said seat back causes dislodging movement of each roller from said respective detent means against said spring bias allowing said seat back to be raised to said upright position.

4. A handleless locking hinge for connecting a seat back relative to a support structure of a vehicle for movement about a hinge axis between an upright position and a collapsed position comprising:

a cup-shaped mounting bracket having a central axis, said mounting bracket connectible to said seat back centered on said hinge axis, said mounting bracket having an interior surface;

detent means for stopping and for releasably holding said seat back in said collapsed position, such that a predetermined force applied to said seat back in a direction toward said upright position releases said seat back from said collapsed position, wherein said detent means includes two opposing elongated detent springs, each spring connected to said interior surface of said mounting bracket at a first end and extending inwardly and arcuately toward said hinge axis with a detent formed spaced inwardly from said first end adjacent a second end, said detent concave with respect to said hinge axis;

an elongated support having a central axis disposed coaxial with said hinge axis, said support connectible to said support structure at a first end and having a second end extending inwardly within said mounting bracket; and projection means supported from said elongated support for engaging said detent means when in said collapsed position.

5. A handleless locking hinge for connecting a seat back relative to a support structure of a vehicle for movement about a hinge axis between an upright position and a collapsed position comprising:

a cup-shaped mounting bracket having a central axis, said mounting bracket connectible to said seat back centered on said hinge axis, said mounting bracket having an interior surface;

detent means for stopping and for releasably holding said seat back in said collapsed position, such that a predetermined force applied to said seat back in a direction toward said upright position releases said seat back from said collapsed position;

an elongated support having a central axis disposed coaxial with said hinge axis, said support connectible to said support structure at a first end and having a second end extending inwardly within said mounting bracket; and projection means supported from said elongated support for engaging said detent means when in said collapsed position, wherein said projection means includes two opposing generally cylindrical elongated rollers having longitudinal axes disposed on opposite radial sides of said elongated support in a common plane with said hinge axis, each roller supported at both ends from said elongated support within said cup-shaped mounting bracket for engagement with said detent means, when in said collapsed position such that a predetermined force applied to said seat back causes dislodging movement of each roller from said detent means allowing said seat back to be raised to said upright position.

6. A handleless locking hinge for connecting a seat back relative to a support structure of a vehicle for movement about a hinge axis between an upright position and a collapsed position comprising:
- a cup-shaped mounting bracket having a central axis and connectible to said seat back centered on said hinge axis, said cup-shaped mounting bracket having an interior surface;
- two opposing elongated detent springs, each spring connected to said interior surface of said cup-shaped mounting bracket at a first end and extending inwardly and arcuately toward said hinge axis with a detent formed adjacent a second end, said detent concave with respect to said hinge axis;
- an elongated support having a central axis disposed coaxial with said hinge axis, said support connectible to said support structure at a first end and having a second end extending inwardly within said cup-shaped mounting bracket;
- two opposing generally cylindrical elongated rollers having longitudinal axes disposed on opposite radial sides of said elongated support in a common plane with said hinge axis, each roller supported at both ends from said elongated support within said cup-shaped mounting bracket for engagement with a respective one of said springs, each roller engaged within said detent of said respective one of said springs when in said collapsed position such that a predetermined force applied to said seat back causes dislodging movement of each roller from said respective detent against said spring bias allowing said seat back to be raised to said upright position.

* * * * *